Sept. 20, 1960  G. K. REEN ET AL  2,953,123
ELECTROHYDRAULIC SERVO VALVE
Filed Oct. 30, 1959  5 Sheets-Sheet 4

Inventors
Gerald K. Reen
John A. Trevett
By their attorneys
Howson and Howson

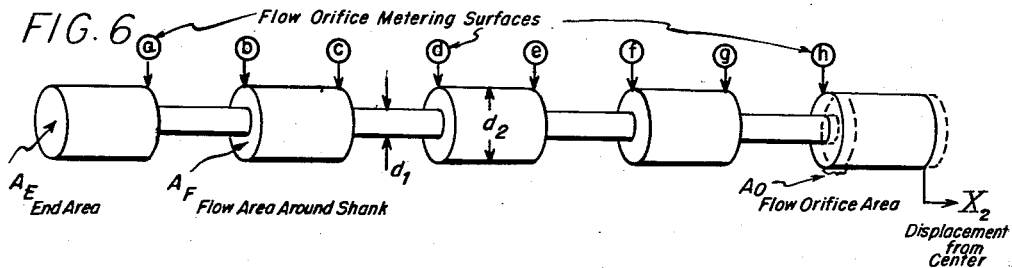
FIG. 6
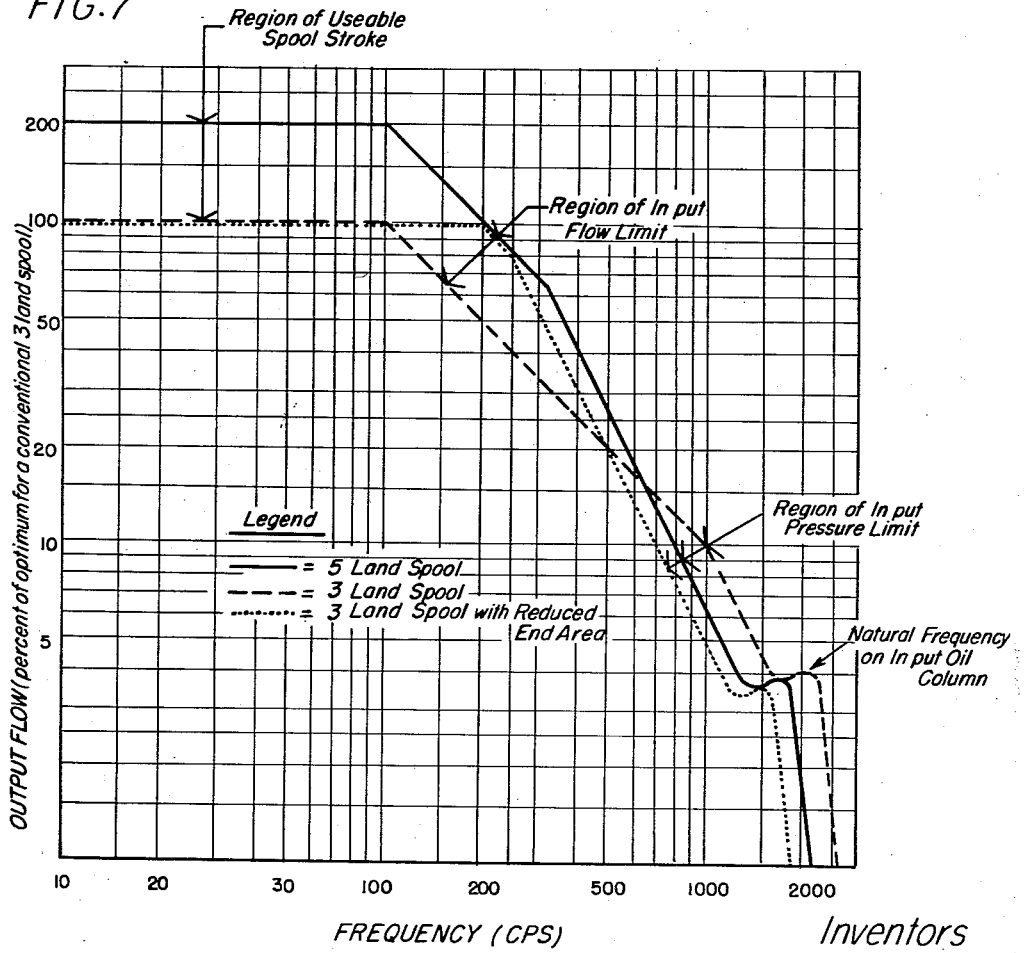
FIG. 7 COMPARATIVE FLOW VERSUS FREQUENCY

United States Patent Office 2,953,123
Patented Sept. 20, 1960

2,953,123

ELECTROHYDRAULIC SERVO VALVE

Gerald K. Reen and John A. Trevett, Orange, Conn., assignors to Textron Electronics, Inc., Providence, R.I., a corporation of Delaware Filed Oct. 30, 1959, Ser. No. 849,951

4 Claims. (Cl. 121—157)

This invention is for improvements in electrohydraulic servo valves adapted to convert direct current hydraulic energy into alternating hydraulic energy to be used in a vibration exciter. It is a valve adapted to cause the actuator of the exciter to vibrate in response to a low level electrical signal input and to control the amplitude and frequency of vibration. One object of the invention is to increase the strength of the exciter without increasing the electric signal or sacrificing the range of frequencies over which the device can be used. This is achieved by means which are simple and easy to construct. Our invention is related to the construction of a spool type servo valve.

In the drawings Fig. 1 is a schematic view of an electrohydraulic servo valve and exciter actuator of the prior art showing a three land spool valve at the power stage, the clearance around the lands being much exaggerated.

Fig. 6 is a perspective diagram of a five land spool according to the invention.

Fig. 7 is a graph comparing the flow at different frequencies of the conventional three land spool valve, and three land spool with reduced end area and the five land spool.

Figure 1:
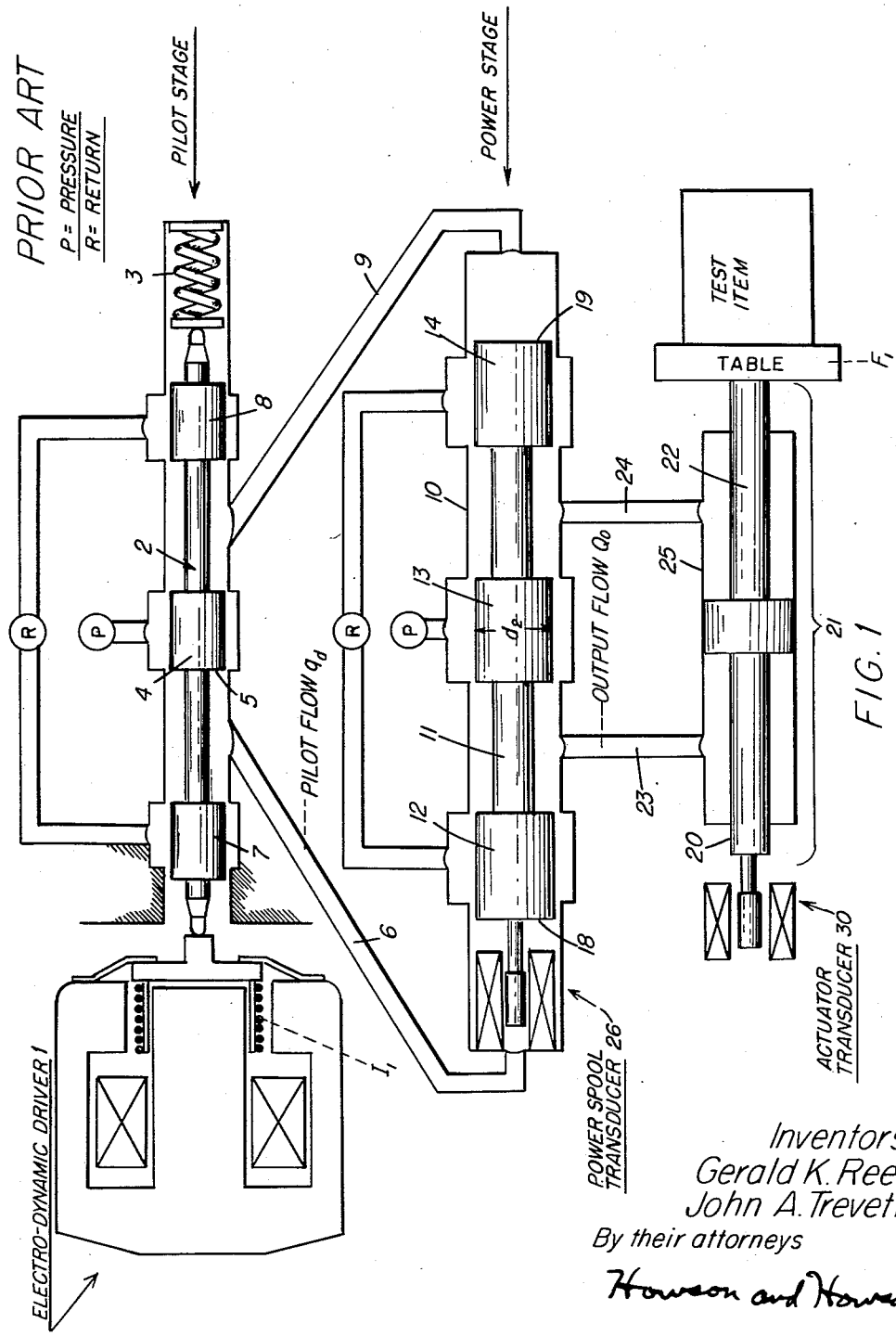

In devices of the sort to which this invention relates a small or low level electric signal is used to operate and control the device. As shown in Fig. 1 an electrical instrument, such for example as an electrodynamic driver 1 is used to displace longitudinally the spool 2 of a spool valve, which spool is restrained by a spring 3 at the opposite end of the spool from the driver 1. This converts the alternating electric current in the driver into alternating movement of the spool.

The embodiment we are about to describe is of a valve which has both a pilot stage and a power stage but it should be understood that the invention can be used to advantage in a servo valve that has only one hydraulic stage. This single stage construction would have many of the advantages obtained with the embodiment that we have chosen and which contains both a pilot stage and a power stage. In the case of a single stage valve which we will call the pilot stage, that would have the five land construction shown in the power stage of the embodiment hereinafter described but would have many of the advantages of the invention. Thus, for example, the pilot stage by itself has the advantage of producing vibrations of high frequency. What we have hereinafter termed the "gain" and hence the frequency band width of the conventional pilot stage can be increased by approximately a factor of 2 with our five land system and the factor of course could be increased still higher if more lands are employed. This is true in spite of the fact that the pilot stage is driven by the electrodynamic driver rather than by hydraulic fluid.

The immediate objective is to connect the sides of the exciter piston alternately to a high pressure source and then to a low pressure exhaust. If the flow of oil out of the pilot stage through its connections is not strong enough for the desired size of exciter, a power stage spool type valve has to be added in series to the pilot stage. The embodiment which we have chosen to be shown and described uses the conventional three land pilot stage and a five land power stage constructed as hereinafter set forth.

The pilot stage spool 2 has three lands of which a center land 4 is adapted to be connected to an hydraulic power source P. When the electrodynamic driver 1 moves the spool to the right from the position shown in Fig. 1, oil flows past the left end 5 of the center land and into a connection 6 leading to the left end of the power stage valve hereinafter described. This connection 6 at the pilot stage is located between the center land 4 and the land 7 at the left end of the valve. There is a similar land 8 at the right end of the pilot valve spool and a connection 9 between the center land 4 and end land 8 at the pilot stage and the right end of the power stage valve. The two end lands 7, 8 are connected to an exhaust or low pressure return R. Thus the pilot stage alternately connects the ends of the power stage to the pressure P and the return R. The casing 10 for the power stage spool 11 has been shaped for three lands 12, 13, 14 arranged in corresponding manner to the pilot stage. The center land 13 is adapted to permit admission of oil from the same pressure source P as the pilot stage center land 4 when the spool 11 is displaced. The end lands 12 and 14 were for the low pressure return R. The pressures P and returns R from the two stages can be united respectively at the pressure pump 15 with which they operate (see Fig. 2). The flow from the pilot stage comes to the power stage through connections 6, 9 to the ends 18, 19 of the power stage spool.

The oil which flows through the pilot stage displaces the power stage spool. When displaced to the right the source of pressure P is connected to the left end 20 of the actuator 21 of the exciter and the return R to the right end 22 of the actuator. Displacement of the power stage to the left reverses these connections. The connections from the power spool 11 to the actuator ends 20 and 22 are indicated in Fig. 1 at 23 and 24. Each connection is attached to the casing 10 of the power stage between the center land and the land at its end of the spool and is attached to the cylinder 25 for the actuator 21. The actuator has a piston as usual. The table carrying the test item is on one end of the actuator.

Figure 2:
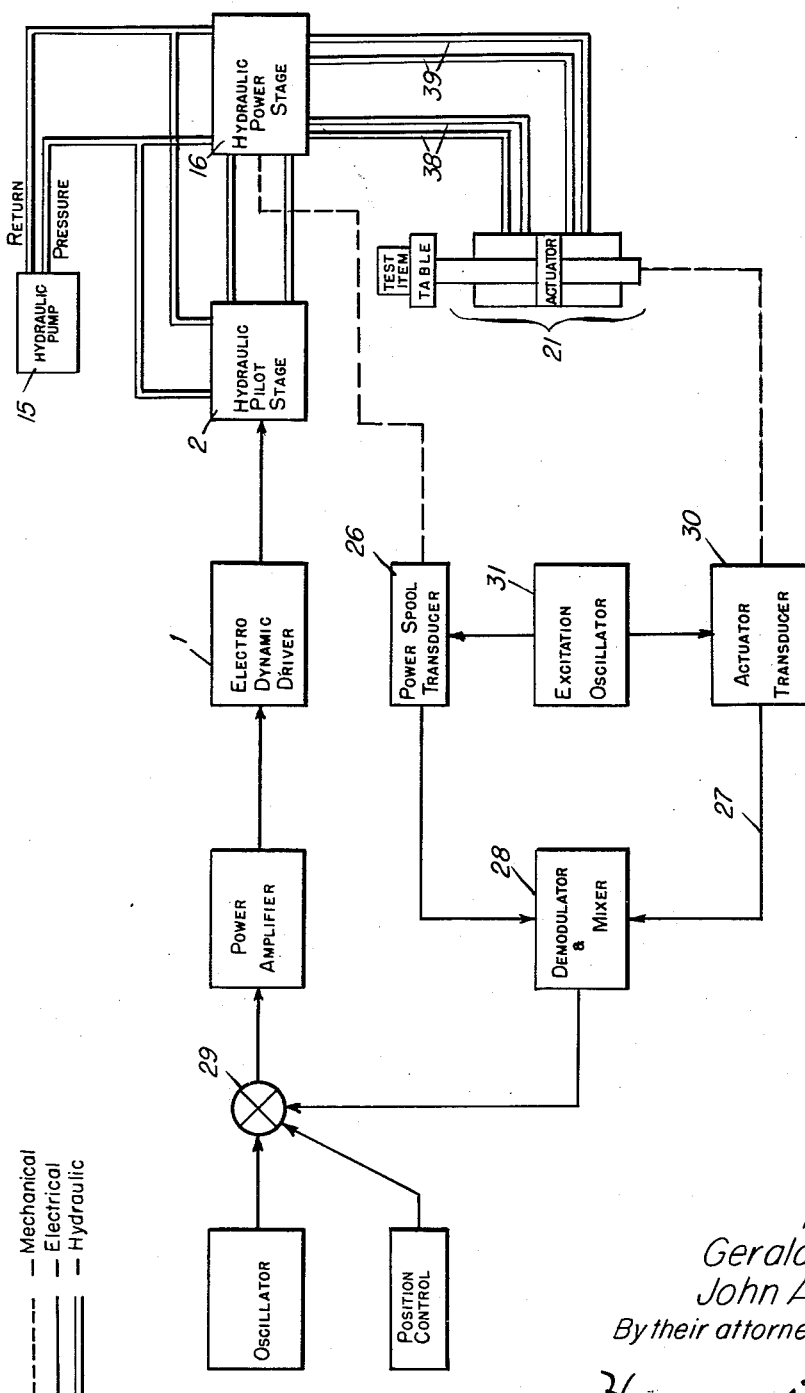
Fig. 2 is a block diagram of the servo valve connections, electrical, hydraulic and mechanical, for a hydraulic vibration exciter such as in Fig. 1 when modified according to our invention.

In order to maintain the power spool 11 in its neutral position a transducer 26 is attached to one end of the spool. The reciprocatory movement of the spool produces an electrical signal proportional to the displacement of the spool. As shown in Fig. 2 this signal is utilized in a conventional feed back circuit. The excitation for the transducer 26 is obtained from an oscillator 31. The feed back signal is summed up in the amplifier at 29, and is then raised in power level in order to center the power valve. In the same way transducer 30 positions the actuator 21. Thus the system is controlled with the electrical signals while the amplitude and frequency of vibration is varied.

Turning now to the need of increasing hte power of the exciter starting from the old low level electrical signal, it should be recognized that the flow out of the power stage is determined by the orifice opening which results when the power spool is displaced. Basically an electrohydraulic servo valve produces a flow output $Q_0$ for a given input current I, into the device. With standard techniques, an output flow of $2Q_0$ can be obtained for a given input current I. Unfortunately, however, this is obtained at the expense of frequency response such that the new output $2Q_0$ can be obtained only at a lower frequency of $F_2$ than the old frequency F, obtained with output $Q_0$. It can be shown that the diameter of the power spool $d_2$ determines the output flow $Q_0$ as well as the flow from the pilot stage $q_d$ which is necessary to drive the power spool. The gain of the power stage can be defined as $$\frac{Q_0}{q_d}$$

It has heretofore been suggested how the area of the lands in the power spool can be increased but the amount of output required from the pilot stage kept at its original figure. This was to be done by reducing the effective area of the ends on the power stage spool. The surfaces exposed to the oil from the pilot stage were sealed off from the rest of the spool. This is shown in the Carson Patent 2,790,427. We have found that this not only creates certain manufacturing difficulties but affects performance in a number of ways hereinafter explained. This method of making the spool diameter at the ends smaller than the lands is undesirable from the manufacturing point of view because of the close tolerances it requires to maintain the necessary concentricity and sliding seals between the two diameters on the mating pieces.

To determine more clearly what the nature of the problem was, and in a practical way, we calculated $$\frac{Q_0}{q_d}$$

as follows:

Let $Q_0$, the flow to the actuator, equal an orifice constant times the area of a single orifice times the square root of the head of fluid dropped across a single orifice—

$$Q_0 = CA_0\sqrt{h}$$

Let the area of a single orifice $A_0$ equal 3.1416 times the diameter $d_2$ of the power spool times the spool displacement single amplitude—

$$A_0 = \pi d_2 X_2$$

In order to maintain the stress and deflection in the spool shank within limits we establish—

$$A_S = \frac{A_E}{10}$$

where $A_S$ = shank area $A_E$ = land area $\frac{\pi d_2^2}{4}$ $A_F = A_E - A_S = 0.9 A_E$ where $A_F$ = oil flow area between spool lands.

In order to prevent flow saturation of the valve at maximum stroke ($X_2$) the area $A_F$ should be at least three times $A_0$ maximum.

$$A_F = 3A_0$$

Substitute and solve for $d_2$ $$0.9\frac{\pi}{4}d_2^2 = 3\pi d_2 X_2$$

$$d_2 = \frac{12}{0.9}X_2 = 13.3 X_2$$

Substitute this in $A_0$ gives $$A_0 = (13.3)\pi X_2^2$$

and $$Q_0 = \pi(13.3)C\sqrt{h}X_2^2$$

Determine flow required to drive spool $q_d$.

$$q_d = \frac{\pi}{4}d_2^2 \overset{\circ}{X}_2$$

where $\overset{\circ}{X}_2$ = power spool velocity

But $\overset{\circ}{X}_2 = wX_2$ $d_2^2 = (13.3)^2 X_2^2$ $q_d = (13.3)^2\frac{\pi}{4}wX_2^3$ Summary:

$$Q_0 = \pi(13.3)CX_2^2\sqrt{h} \text{ or } \frac{\pi C}{13.3}d_2^2\sqrt{h}$$

$$q_d = (13.3)^2\frac{\pi}{4}wX_2^3$$

$$\text{Gain} = \frac{Q_0}{q_d} = \frac{0.3C\sqrt{h}}{wX_2} \text{ or } \frac{4C\sqrt{h}}{wd_2}$$

A study of these last equations indicates that there are only three ways to increase the flow capacity of the power stage $Q_0$. One is to increase the head $h$ of fluid dropped across a single orifice, another is to increase the usable spool displacement $X_2$, and the third is to increase the spool diameter $d_2$. Since $h$ has practical limits, $X_2$ and $d_2$ are the most important variables.

Further, the power stage gain varies inversely with the frequency, the usable spool displacement $X_2$, and the spool diameter $d_2$. In other words, if one seeks to extend the frequency range or the flow capacity of the power stage, the gain in the valve is reduced and consequently the pilot stage requirements increase rapidly.

Figure 3:
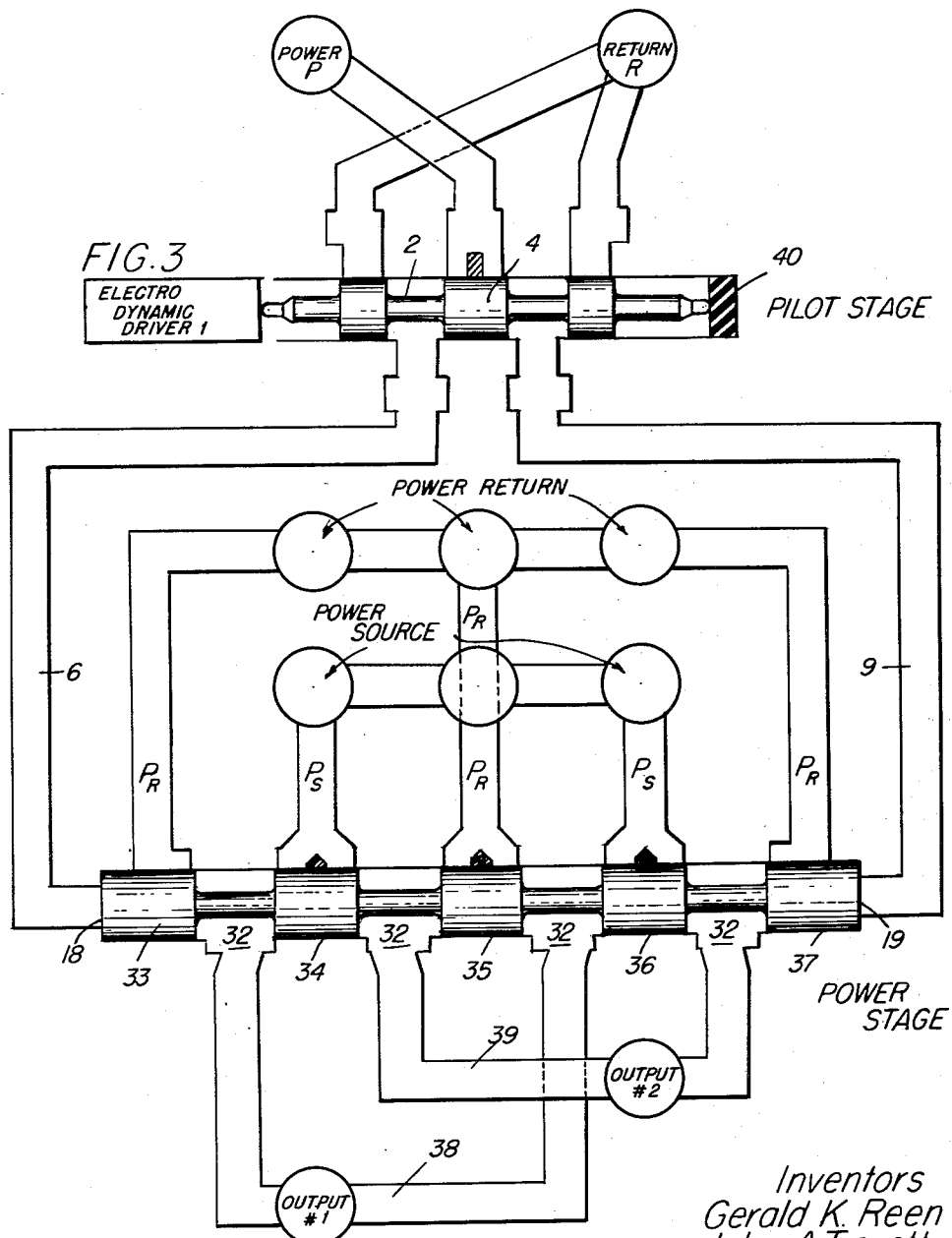
Fig. 3 is a schematic diagram of the piping connections for our novel servo valve using a five land power spool and suitable for use in Fig. 2.

However, since the basic problem underlying the points above lay in the fact that both the flow capacity out of the power stage and the flow required to drive the power spool are determined by the spool diameter, our practical solution to the problem is to increase the number of metering surfaces on a given spool without changing the spool diameter by connecting the ports from the lands to the actuator in parallel as shown in Fig. 3. We have added center lands.

We found that the common construction of a spool type valve contains four active metering surfaces at the power stage. These four surfaces meter the hydraulic flow from the pressure source to the actuator and the corresponding flow to the return. These four metering surfaces can be arranged by designing a conventional spool with either three or four lands. The arrangement of the flow passages remains the same in both cases, thereby retaining the same flow pattern. In the three land spool designs shown in Fig. 1 the flow is metered at the pressure port and at the return ports. In a four land spool design the flow is metered at the two load ports.

In comparison to these prior art power stage designs with four metering surfaces, our new five land construction incorporates a total of eight metering surfaces.

It should be noted that these eight metering surfaces are obtained by adding only two additional lands to the common three land design (see Fig. 3). The lands are numbered 33, 34, 35, 36 and 37. Thus we do not increase the number of lands by the gain factor of 2. Only the number of land ends to which metering functions were assigned is increased by that factor.

The flow pattern of our five land embodiment is such that the two pressure passages $P_S$ come in parallel from the same pressure source to the power spool, and the three return passages $P_R$ going back to the pump 15 (Fig. 2) are in parallel. These five passages are arranged in alternation $P_R$, $P_S$, one for each land (Fig. 3). Between every two lands there is an output port 32. The first and third ports 32 are connected by parallel passages 38 to output 1. The second and fourth ports 32 are connected by parallel passages to output 2. Output 1 goes to one side of the actuator piston and output 2 to the other. It will be seen that the output passages are in parallel or tandem but all the spool lands are operated from the same input source, i.e. in series. Also the lands in series are not double in number but the gain of the power stage is doubled.

It will be seen that the lands of the spool are physically connected in series for operation by the flow from the pilot stage while the lands feed outflow to the actuator piston by connections or passages in parallel.

Figure 4:
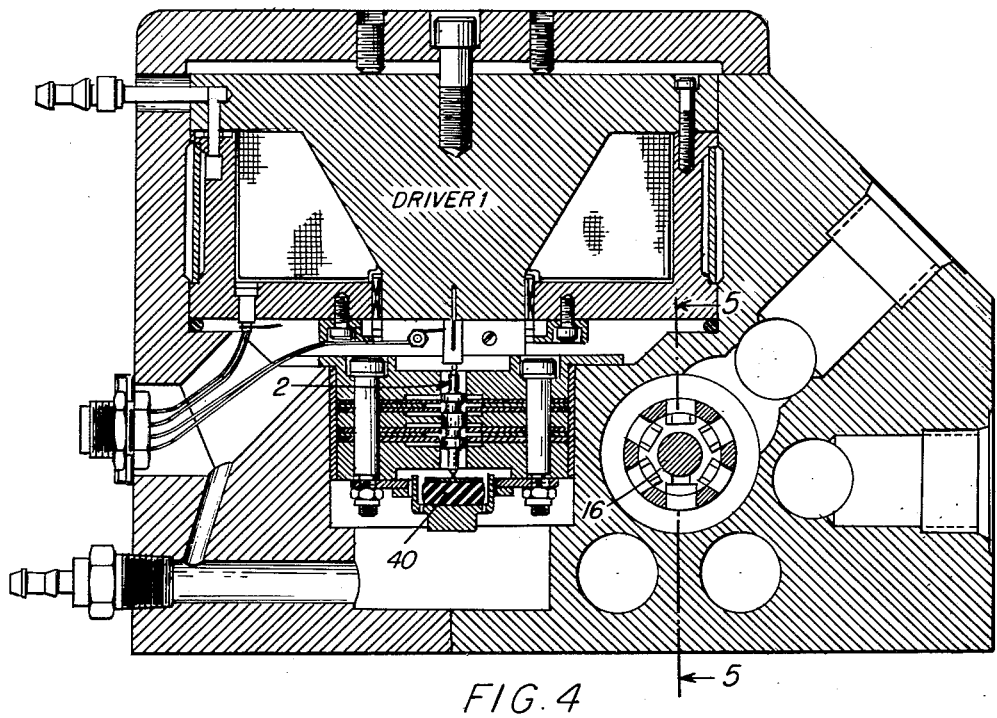
Fig. 4 is a view in vertical cross section across the electrohydraulic servo valve of an exciter embodying the servo valve shown schematically in Fig. 3. It shows the pilot stage in the center and the power stage at the right.
Figure 5:
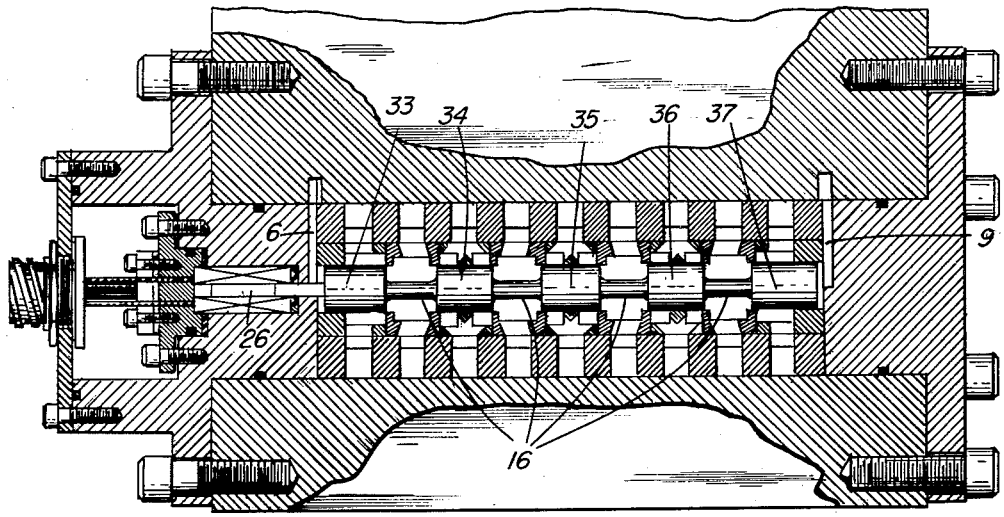
Fig. 5 is a view in vertical longitudinal section through the structure of Fig. 4 taken at 90° removed from the sectional view of Fig. 4.

The showing of the pilot stage of our invention, Fig. 4, differs from the diagram of Fig. 1 in that the spring 3 is replaced by a resilient cushion 40.

The construction of the embodiment of Figs. 3, 4, 5 and 6 having been described, its operation will now be set forth in so far as it concerns the servo valve directly. Assuming that an electrical impulse is received by the electrodynamic driver 1, the pilot stage spool 2 will be pushed to the right in Fig. 3 and downwardly in Fig. 4 against the resilient cushion 40. With the spool 2 in this position the fluid connection 6 from the pilot stage to the power stage will be opened past the left end of the center land 4 of the spool and the return for the exhaust will be connected to the fluid passage 9. As a result of the relatively high pressure on the left end 18 of the power spool and the relatively low pressure on the right end 19 of that spool, this latter spool will also be moved to the right at the same time as the pilot spool. This will open the metering surfaces at the left ends of the lands 34 and 36. This movement also causes the left end land 33 to shut off the left hand return connection $P_R$ and open the middle and right hand $P_R$ connections by movement of the middle land 35 and the right hand end land 37. It will be seen that the power stage therefore has passages connecting the lands to the exciter in parallel, while from the point of view of the flow from the pilot stage the lands are in series. This gives us the increased output flow and the desired gain at the power stage.

Electrohydraulic driver 1, aided by the cushion 40, moves the pilot spool to the left, the center land 4 brings into action the connection between the pressure source and the connection 9 to the right end of the power stage spool. Therefore the power stage spool 16 will also move to the left. While this does not open the return connection $P_R$ at the right of Fig. 3, the right end of the four remaining lands, namely, 33, 34, 35 and 36, all open ports as follows: The lands 34 and 36 open the ports 32 leading to the parallel connections 39 to output 2 to the pressure source $P_S$ while keeping their connections to the return closed while the right ends of lands 33 and 35 are open to the return connections $P_R$. Thus output 1 is connected in parallel to two exhaust passages and output 2 to two pressure flows. This will result in having the actuator 21 move in the opposite direction from the one occupied when the two spools were at the right and the reciprocation or alternation is thus maintained under the direct control of the driver 1.

The power spool neutral position shown in the drawings is maintained by the transducers 26 and 30 working with the driver and the other electrical elements shown and described above.

In order to summarize the capabilities and advantages of our invention we have supplied as Fig. 7 a graph showing the comparative flows obtainable at different frequencies from the conventional three land spool valve, the three land spool valve with reduced end area and our five land spool valve. The major improvements in performance of our five land spool over the others are as follows:

(1) Two times the output flow can be achieved by the five land design in the "region of usable spool stroke" (see Fig. 7).

(2) The maximum output flow that can be obtained from the conventional three land spool can be obtained from the five land spool to two times the maximum frequency to which this flow can be obtained for the conventional three land spool.

(3) The weight of the five land spool has increased by a factor of 5/3, while the end area has remained constant. The weight of the reduced end area three land spool has remained constant, but the end area has come down by a factor of 2. Therefore, the ratio of weight to end area is less for the five land spool than for the reduced end area three land spool. This means that the five land spool will operate to higher frequencies before encountering the "region of input pressure limit." (See Fig. 7.)

(4) Because of the reduction in end area of the three land spool the natural frequency of the spool on its input oil column is lower by a larger factor than that of the five land spool on its input oil columns. This means that the ultimate cut-off frequency is higher for the five land spool than for the reduced end area three land spool.

(5) The curve shows the approximate theoretical performance to be expected. However, additional dynamic forces that are introduced in providing for an end area seal in the reduced end area design, will serve to further limit the frequency response of this device above the "region of usable spool stroke."

(6) The manufacturing difficulties associated with providing for a reduced end area spool requires additional alignment problems, sealing problems, and lapping problems that are not encountered in the five land design.

The invention achieves power stage gain without loss of frequency. It is also advantageous in terms of its simplicity, its manufacturing costs and in that it does not introduce serious new problems associated with the operational or dynamic forces on the spool. Also the weight of the spool itself does not increase as rapidly with an increase in flow output as would be true if the increase in flow output were due to increase in the diameter of the spool. Thus our five land construction doubles the flow capacity but only increases the mass by 60 percent. A servo valve made according to our invention could have five- seven or nine, etc. lands.

What is claimed is:

1. An electrohydraulic servo valve for a vibration exciter with an actuator piston and powered by a direct current hydraulic power source, comprising a valve having one or more spools, there being at least five spaced lands on one spool adapted to convert direct into alternating hydraulic power, low level electrical means to control reciprocation of the spools, parallel passages connecting one side of the actuator piston to alternate spaces between the lands on said five land spool, and similar parallel passages connecting the other side of the actuator piston to the intervening spaces between said lands, in combination with flow orifice metering surfaces at the ends of said lands which face spaces between them, other passages from and to the direct current power source adapted to be connected to the metering surfaces selectively as the spool reciprocates; whereby there is a gain in the power transmitted to the exciter without lowering the frequency of vibration.

2. An electrohydraulic servo valve for a vibration exciter with an actuator piston and powered by a direct current hydraulic power source, comprising a low level electrical input means, a pilot stage spool valve driven by the electrical input means and adapted to convert direct current hydraulic power from the power source into alternating hydraulic power, and a power stage spool valve having at least five spaced lands driven by the alternating hydraulic power, parallel passages connecting one side of the actuator piston to alternate spaces between the lands on said five land spool, and similar parallel passages connecting the other side of the actuator piston to the intervening spaces between said lands, in combination with flow orifice metering surfaces at the ends of said lands which face spaces between them, other passages from and to the direct current power source adapted to be connected to the metering surfaces selectively as the spool reciprocates; whereby there is a gain in the power transmitted to the exciter by the power stage valve over the pilot stage valve without limiting the frequency of vibration.

3. An electrohydraulic servo valve according to claim 2 in which there are connections from the pilot spool valve applying the alternating hydraulic energy from the pilot spool valve at the outside end area of the two end lands of the power stage valve using the maximum effective area of the ends of said lands whereby the increase in the number of metering orifices driven in series by the flow applied at the ends of the spool causes gain in the outflow controlled by the spool.

4. An electrohydraulic servo valve for a vibration exciter with an actuator piston and powered by direct current hydraulic power, comprising a spool valve with one or more spools having at least five spaced lands on one spool, said five land spool being adapted to convert the direct into alternating hydraulic power, low level electrical means to reciprocate one of the spools, parallel passages connecting one side of the actuator piston to alternate spaces between the lands on said five land spool, and similar parallel passages connecting the other side of the actuator piston to intervening spaces between said lands, in combination with other passages connected opposite the lands from and to the direct current hydraulic power; and orifice metering surfaces at each end of each land except the outside ends of the end lands adapted to connect the power passages to the actuator piston passages as said spool reciprocates; whereby the weight of said spool is less in proportion than the gain in output flow.

References Cited in the file of this patent

UNITED STATES PATENTS

| | | |
|---|---|---|
| 2,192,402 | Gruetjen | Mar. 5, 1940 |
| 2,584,127 | Harcum et al. | Feb. 5, 1952 |
| 2,904,056 | Callender | Sept. 15, 1959 |
| 2,916,049 | Ruhl et al. | Dec. 8, 1959 |